United States Patent [19]

Hiramitsu et al.

[11] Patent Number: 4,574,653

[45] Date of Patent: Mar. 11, 1986

[54] PAD HOLDER MECHANISM FOR STEERING WHEELS

[75] Inventors: Tetsushi Hiramitsu, Kasugai; Hiroshi Sugita, Ichinomiya; Satoshi Ono, Inazawa, all of Japan

[73] Assignee: Toyoda Gosei Co., Ltd., Nishikasugai, Japan

[21] Appl. No.: 573,350

[22] Filed: Jan. 24, 1984

[30] Foreign Application Priority Data

Jan. 24, 1983 [JP] Japan .................................. 58-9758

[51] Int. Cl.⁴ .............................................. G05G 11/00
[52] U.S. Cl. .................................. 74/484 R; 200/61.54
[58] Field of Search .......................... 74/484 H, 484 R; 200/61.54, 61.55, 61.56

[56] References Cited

U.S. PATENT DOCUMENTS

| 2,631,204 | 3/1953 | Kibiger | 74/484 R |
| 2,894,090 | 7/1959 | Timoff et al. | 74/484 R |
| 3,011,802 | 12/1961 | Ackerman | 74/484 R |
| 3,016,764 | 1/1962 | Fredericks et al. | 74/484 H |

FOREIGN PATENT DOCUMENTS

| 49-17167 | 4/1974 | Japan | 74/484 R |
| 57-47475 | 3/1982 | Japan . | |
| 2068859 | 8/1981 | United Kingdom | 74/484 H |

Primary Examiner—Alan Cohan
Assistant Examiner—John A. Rivell
Attorney, Agent, or Firm—Cushman, Darby & Cushman

[57] ABSTRACT

A pad holder mechanism for use in a steering wheel includes circular guide members mounted respectively on a steering column and a pad disposed one on each side of a boss plate in an axial direction of a steering shaft, the guide members being immovable in the axial direction of the steering shaft. The guide members have continuous cam elements displaced in the axial direction throughout their circumferential length. The boss plate supports a pair of coacting members having opposite ends movable in phase along the cam elements on the guide members. The coacting members and the guide members are relatively positioned such that when the ends of one of the coacting members are positioned at peaks of the displaced cam elements, the ends of the other coacting member are located in positions other than peaks of the displaced cam elements.

7 Claims, 4 Drawing Figures

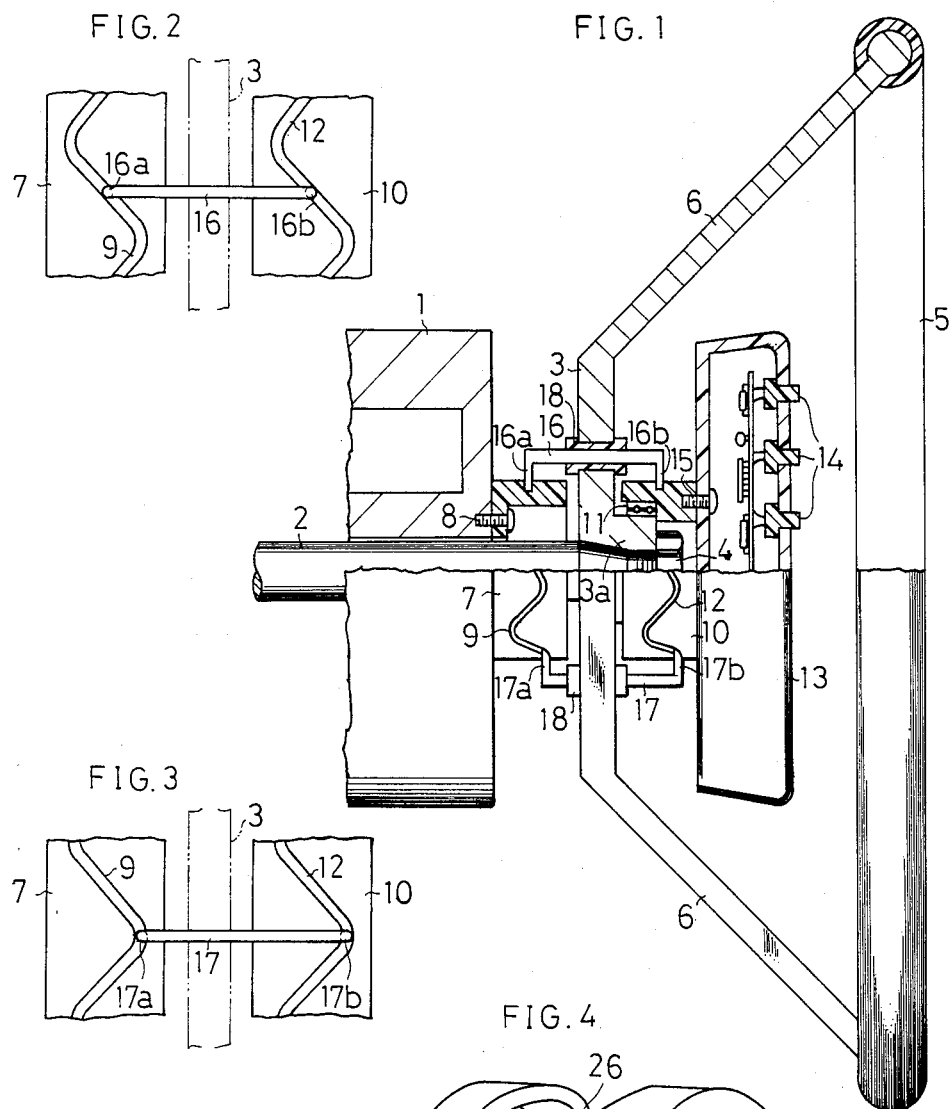

4,574,653

PAD HOLDER MECHANISM FOR STEERING WHEELS

BACKGROUND OF THE INVENTION

1. Field of the Invention

The present invention relates to a pad holder mechanism for holding a pad on a steering wheel against rotation while the steering wheel is being turned.

2. Description of the Prior Art

One known pad holder mechanism for a steering wheel comprises, as disclosed in Japanese Laid-Open Utility Model Publication No. 57-47475, cylindrical members having helical grooves and disposed on a steering column and a pad with a boss plate interposed therebetween, and a coacting member slidably mounted on the boss plate and having opposite ends riding in the respective helical grooves, so that the coacting member will follow the helical grooves on the steering column and the pad.

With the prior mechanism, however, each cylindrical member is normally required to have three through five groove turns commensulate with the number of revolutions of the steering wheel. Therefore, the cylindrical members are elongated in the axial direction.

SUMMARY OF THE INVENTION

It is an object of the present invention to provide a pad holder mechanism for steering wheels which has a reduced length in the axial direction of a steering shaft, and hence can be installed in a small space and assembled with ease.

Another object of the present invention is to provide a pad holder mechanism for steering wheels which has a coacting member held in reliable engagement with a guide member.

Still another object of the present invention is to provide a pad holder mechanism for steering wheels which includes a simple mechanism for reliably preventing a coacting member from being turned with respect to a boss plate.

A still further object of the present invention is to provide a pad holder mechanism for steering wheels which can reliably prevent a pad from wobbling.

According to the present invention, there is provided a pad holder mechanism for use in a steering wheel includes circular guide members mounted respectively on a steering column and a pad disposed one on each side of a boss plate in an axial direction of a steering shaft, the guide members being immovable in the axial direction of the steering shaft. The guide members have continous cam elements such as cam grooves undulating or otherwise displaced in the axial direction throughout their circumferential length. The boss plate supports a pair of coacting members having opposite ends riding slidably in the cam grooves in the guide members. The coacting members and the guide members are relatively positioned such that when the ends of one of the coacting members are positioned at peaks of the displaced cam elements, the ends of the other coacting member are located in positions other than peaks of the displaced cam elements.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a side elevational view, partly in cross section, of a pad holder mechanism according to an embodiment of the present invention;

FIG. 2 is a fragmentary plan view of the pad holder mechanism shown in FIG. 1;

FIG. 3 is a fragmentary bottom view of the pad holder mechanism of FIG. 1; and

FIG. 4 is a perspective view of a pad holder mechanism according to another embodiment of the present invention.

DESCRIPTION OF THE PREFERRED EMBODIMENTS

As illustrated in FIG. 1, a steering column 1 of an automobile supports a steering shaft 2 extending therethrough and having a boss plate 3 fastened by a nut 4 to an end of the steering shaft 2. The boss plate 3 has a central projection 3a projecting away from the steering column 1 toward a pad (described later on). A steering ring 5 rotatable by the driver for steering the automobile is supported on the boss plate 3 by at least one spoke 6 extending radially outwardly from the boss plate 3. The steering ring 5, the spoke 6, and the boss plate 3 jointly constitute a steering wheel.

A cylindrical guide member 7 is fixed endwise to the steering column 1 by a plurality of bolts 8. The guide member 7 has on its cylindrical surface a continuous cam groove 9 extending circumferentially and curved in the axial direction of the guide member 7 in an undulating pattern (a sinusoidal pattern, for example). Another cylindrical guide member 10 is rotatably mounted by a bearing 11 on the projection 3a of the boss plate 3. The guide member 10 is prevented from axially moving or horizontally in FIG. 1. The guide member 10 has on its cylindrical surface a continuous cam groove 12 extending circumferentially and curved in an undulating pattern which is identical to the undulating pattern of the cam groove 9 in phase therewith. A pad 13 on which various switches 14 are mounted is fastened to the guide member 10 by a plurality of bolts 15.

A pair of coacting members 16, 17 each in the form of a rod of square cross section extends through the boss plate 3. The coacting members 16, 17 are longitudinally slidably supported in slide guides 18 attached to the boss plate 3, the coacting members 16, 17 being nonrotatable about their own axes. The coacting members 16, 17 have ends 16a, 17a and 16b, 17b bent toward the guide members 7, 10 and having a circular cross section, the ends 16a, 17a and 16b, 17b riding in the cam grooves 9, 12, respectively. With the coacting members 16, 17 engaging the guide members 7, 10, the cam grooves 9, 12 are held in phase with each other and extend parallel to each other. The cam grooves 9, 12 are spaced at an equal distance from each other throughout their circumferential extent, the distance being equal to the distance between the ends 16a, 17a and the ends 16b, 17b of the coacting members 16, 17.

As illustrated in FIGS. 2 and 3, the coacting members 16, 17 are positioned relatively to the guide members 7, 10 such that when the ends 17a, 17b or 16a, 16b of the coacting member 17 or 16 are located in axial peak positions in the cam grooves 9, 12, the ends 16a, 16b or 17a, 17b are in a position in which they are being displaced along the cam grooves 9, 12 in the axial direction of the guide members 7, 10.

Operation of the pad holder mechanism of the foregoing construction will be described.

When the steering ring 5 is turned for steering the automobile, the boss plate 3 is angularly moved about its own axis to cause the coacting members 16, 17 to turn circumferentially around the guide members 7, 10 while the ends 16a, 16b, 17a, 17b are sliding in and along the cam grooves 9, 12. At this time, since the guide member 7 fixed to the steering column 1 is not allowed to turn, the coacting members 16, 17 are moved horizontally or axially of the guide member 7 along the cam groove 9.

The guide member 10 mounted on the boss plate 3 is not permitted to move horizontally or axially of the boss plate 3, and hence the ends 16b, 17b of the coacting members 16, 17 are caused to slide in and along the cam groove 12 in the guide member 10 in the same manner in which the ends 16a, 17a slide in and along the cam groove 9. Therefore, the guide member 10 is kept positionally in the same condition as that of the guide member 7, so that the guide member 10 and the pad 13 attached thereto will not be turned with respect to the steering column 1.

When the ends 16a, 16b, 17a, 17b of the coacting members 16, 17 are located in axial peak positions in the cam grooves 9, 12, the coacting members 16, 17 may be liable to wobble slightly in the circumferential direction of the guide members 7, 10. However, because the ends 16a, 16b or 17a, 17b of the coacting member 16 or 17 are being displaced along the cam grooves 9, 12 when the other ends are located in axial peak positions in the cam grooves 9, 12, the pad 13 is reliably prevented from wobbling movement.

With the foregoing embodiment, the pad 13 can be supported nonrotatably in the stopped position with the simple mechanism. The mechanism has a reduced axial dimension as the cam grooves 9, 12 are not elongated in the axial direction of the guide members 7, 10. The mechanism can therefore be installed in a relatively small space and assembled with ease.

The present invention is not limited to the foregoing illustrated construction, but may be embodied in various modifications that follow:

(1) As many coacting members 16, 17 as desired may be included. For example, only one such coacting member may be provided. The single coacting member tends to allow the pad 13 to wobble slightly, but causes practically no problem.

(2) Each of the coacting members 16, 17 may be of an elliptical cross section, or may comprise two rods of circular cross section juxtaposed with a small interval therebetween and having opposite ends joined together, so that the coacting members 16, 17 will not be rotated about their axes.

(3) Rollers may be attached respectively to the ends of the coacting members 16, 17 for smooth sliding movement in and along the cam grooves 9, 12.

(4) The cam grooves 9, 12 may be shaped as desired provided they are axially curved or otherwise displayed throughout their circumferential extent. As an example, each of the cam grooves 9, 12 may have at least one curved portion.

(5) The cam grooves 9, 12 may be replaced with ridges on the guide members 7, 10, and the ends of the coacting members 16, 17 may have recesses in which the ridges engage for slidable movement therein.

(6) As shown in FIG. 4, guide members 22, 23 may be attached to the steering column and the pad, respectively, the guide members 22, 23 having cam surfaces 20, 21 undulating in the axial direction of the guide members 22, 23 throughout their circumferential length. At least two coacting members 24, 25 each comprising a rod of square cross section have cam rollers 26 rotatably mounted on opposite ends thereof and held against the cam surfaces 20, 21 for rolling movement thereon. The coacting members 24, 25 and the guide members 22, 23 are relatively positioned such that when the cam roller 26 on one of the coacting members 24, 25 which is held against the guide member 22 on the steering column moves from a higher portion of the cam surface 20 to a lower portion thereof, the cam roller 26 of at least one other coacting member moves from a lower portion of the cam surface 20 to a higher portion thereof. Furthermore, the coacting members 24, 25 are relatively positioned such that the cam rollers 26 of at least one of the coacting members 24, 25 are located in a position in which they are being displaced along the cam surfaces 20, 21 in the axial direction of the guide members 22, 23, when the cam rollers 26 of the other coacting members are positioned on axial peak positions on the cam surfaces 20, 21.

With the arrangement of the present invention, the pad holder mechanism has a reduced length in the axial direction of the steering shaft, can be installed in a relatively small space, and assembled with ease. The pad stopper mechanism can reliably prevent the pad from wobbling movement.

Although certain preferred embodiments have been shown and described, it should be understood that many changes and modifications may be made therein without departing from the scope of the appended claims.

What is claimed is:

1. A pad holder mechanism for use in a steering wheel, comprising:
   (a) a steering shaft;
   (b) a boss plate mounted on said steering shaft;
   (c) a steering column and a pad positioned one on each side of said boss plate in an axial direction of said steering shaft;
   (d) a pair of circular guide members mounted respectively on said steering shaft and said pad against movement in said axial direction of said steering shaft;
   (e) continuous cam elements endlessly formed respectively on said guide members and displaced in said axial direction throughout circumferential extents of said guide members; and
   (f) at least one coacting member movably mounted on said boss plate and having opposite ends movable in phase along said cam elements, respectively.

2. A pad holder mechanism according to claim 1, wherein said coacting members extend through said boss plate in said axial direction of the steering shaft, each of said coacting members comprising a rod of square cross section so as to be prevented from being turned about an axis thereof with respect to said boss plate.

3. A pad holder mechanism for use in a steering wheel, comprising:
   (a) a steering shaft;
   (b) a boss plate mounted on said steering shaft;

(c) a steering column and a pad positioned one on each side of said boss plate in an axial direction of said steering shaft;

(d) a pair of circular guide members mounted respectively on said steering shaft and said pad against movement in said axial direction of said steering shaft;

(e) continuous cam elements formed respectively on said guide members and displaced in said axial direction throughout circumferential extents of said guide members; and (f) at least one coacting member movably mounted on said boss plate and having opposite ends movable in phase along said cam elements, respectively, wherein said coating members extend through said boss plate in said axial direction of the steering shaft, each of said coacting members comprising a rod of square cross-section so as to be prevented from being turned about an axis thereof with respect to said boss plate, wherein said guide members are cylindrical in shape, said cam elements comprising undulating cam grooves defined in outer circumferential surfaces of said guide members, respectively, said opposite ends of said coacting member riding slidably in said cam grooves, respectively.

4. A pad holder mechanism for use in a steering wheel, comprising:

(a) a steering shaft;

(b) a boss plate mounted on said steering shaft;

(c) a steering column and a pad positioned one on each side of said boss plate in an axial direction of said steering shaft;

(d) a pair of circular guide members mounted respectively on said steering shaft and said pad against movement in said axial direction of said steering shaft;

(e) continuous cam elements formed respectively on said guide members and displaced in said axial direction throughout circumferential extents of said guide member; and (f) at least one coacting member movably mounted on said boss plate and having opposite ends movable in phase along said cam elements, respectively, wherein said coating members extend through said boss plate in said axial direction of the steering shaft, each of said coacting members comprising a rod of square cross-section so as to be prevented from being turned about an axis thereof with respect to said boss plate, wherein said guide members are cylindrical in shape, said cam elements comprising cam surfaces defined on confronting ends of said guide members, respectively, and undulating in said axial direction, said coacting member having a pair of cam rollers disposed respectively on said opposite ends and held in rolling engagement with said cam surfaces, respectively.

5. A pad holder mechanism for use in a steering wheel, comprising:

(a) a steering shaft;

(b) a boss plate mounted on said steering shaft;

(c) a steering column and a pad positioned one on each side of said boss plate in an axial direction of said steering shaft;

(d) a pair of circular guide members mounted respectively on said steering shaft and said pad against movement in said axial direction of said steering shaft;

(e) continuous cam elements formed respectively on said guide members and displaced in said axial direction throughout circumferential extents of said guide members; and (f) at least one coacting member movably mounted on said boss plate and having opposite ends movable in phase along said cam elements, respectively, including a pair of said coacting members are provided, said cam element having an undulating form and said pair of coacting members and said guide members being relatively positioned such that when the ends of one of said pair of coacting members are positioned at peaks of the displaced cam elements, the ends of the other coacting member are located in positions other than peaks of the displaced cam elements.

6. A pad holder mechanism as in claim 1, wherein said endless cam element has an axially undulating form.

7. A pad holder mechanism as in claim 1, wherein said endless cam element is in the form of a groove formed in said guide members.

* * * * *